Jan. 5, 1932.  H. L. JOYCE  1,840,039
INDICATOR NEEDLE
Filed April 7, 1930

Inventor:
Harold L. Joyce
By Hill & Hill

Witness:
William P. Kilroy

Patented Jan. 5, 1932

1,840,039

UNITED STATES PATENT OFFICE

HAROLD L. JOYCE, OF CHICAGO, ILLINOIS, ASSIGNOR TO JAS. P. MARSH & COMPANY, OF CHICAGO, ILLINOIS, A CORPORATION OF ILLINOIS

INDICATOR NEEDLE

Application filed April 7, 1930. Serial No. 442,193.

The invention relates to improvements in indicating needles such as are commonly employed in pressure gauges, clocks, watches, compasses, etc., and has as its prime object providing an article of this character with means whereby it may be readily associated with a shaft and be held against relative rotation without the necessity of reaming the opening formed in the needle or fitting the shaft to the opening.

It is an object of the invention to provide an article such as above referred to with means which is preferably of tubular formation and formed of relatively soft metal which will yield upon introduction of a shaft thereto and thus accommodate itself to shafts of various diameters and result in frictionally engaging the shaft to thereby hold the shaft and the article against relative rotation, yet will allow separation of the needle and shaft when this is found necessary or desirable.

Another object of the invention is to form the tubular member so that a flange or head is provided, the flange or head providing means for limiting movement of said member relatively to an opening provided in the body of the indicator, to thereby provide means which will facilitate permanent association of said member and indicator and which will, during the soldering or brazing operation, form a means for holding the solder.

The invention has as a further object providing both the indicator and the shaft with means which cooperate with each other to frictionally hold the shaft and indicator against relative rotation, said means including a tubular member which projects from a side of the indicator and is preferably of a soft metallic character, the shaft being tapered so that when the tapered end of the shaft is introduced thereto, said projection may expand to the diameter of the shaft and accommodate the tapered end of the shaft, and thus frictionally hold these elements in associated relation.

The invention has these and other objects, all of which will be more readily understood when read in conjunction with the accompanying specification and drawings forming a part hereof, it being obvious that changes and modifications may be resorted to without departing from the spirit of the appended claims forming a part hereof.

Figure 1:
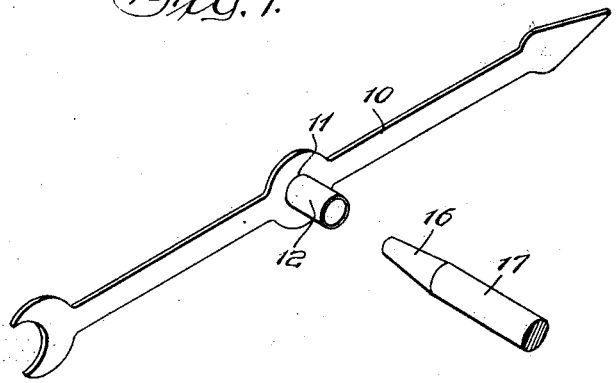
Figure 2:
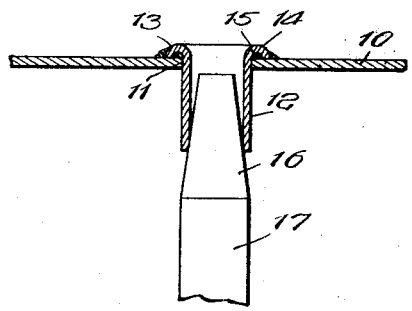
Figure 3:
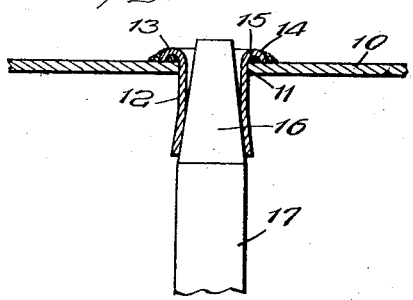

In the drawings, Fig. 1 is a perspective view of an indicator and a shaft with which the indicator is adapted to be associated, the elements being shown in separated relation for the purpose of illustration;

Fig. 2 is a sectional view of a portion of the indicator needle shown in Fig. 1 showing a step in applying said indicator to an end of a shaft; and Fig. 3 is a view similar to Fig. 2 showing the relation of the shaft and indicator with these parts associated with each other and in a position to prevent relative rotation of the indicator with respect to the shaft.

In the drawings, the body of the indicator is designated 10. Said indicator is provided with an aperture 11 through which a tubular element 12 is adapted to be inserted. This tubular element generally designated 12 is preferably open-ended and, as shown in Fig. 2, has one end thereof such as 13 turned outwardly as indicated at 14, to provide a head or flange which will limit endwise movement thereof relatively to the indicator 10 in one direction and in addition form an annular recess 15 which is adapted to receive solder or brazing material for permanently securing the tubular element with respect to the indicator 10.

It will be noted by referring to the drawings that this tubular element 12 is of a substantial length and as before stated, said element 12 is preferably formed of some suitable relatively soft metal or alloy such as brass, which will readily yield when applied to the tapered end 16 of a shaft such as 17. It is evident that by tapering the end of the shaft and employing a tubular element such as 12, which is of relatively soft material, that this arrangement provides means whereby shafts of various diameters may be readily associated with the indicator. It is manifest that when these elements are associated with each other and the indicator is moved toward the larger end of the taper of the shaft or the reverse operation is resorted to, the relatively soft tubular portion 12 will expand and accommodate itself to the particular dimension of the taper of the shaft which will frictionally hold the shaft and indicator against relative rotation, yet will allow the indicator to be removed from said shaft when this is found necessary or desirable.

It is manifest that the arrangement provides an extremely simple one for securing an indicator to a shaft and in addition provides a simple arrangement for securing the tubular element 12 within the aperture 11 of the indicator, as all that is necessary is to apply solder or brazing material within the recess 15 and if so desired, at the outside thereof, and then apply an electric current to the flanged end of the tubular element which will cause fusion of the solder or brazing material.

Having thus described the invention, what I claim and desire to cover by Letters Patent is:

1. An indicator of the kind described comprised of a member having an aperture, a tubular element of relatively soft metal located in said aperture, and one end of said element being formed with an annular flange turned over to engage said element to provide a pocket for the reception of solder to thereby firmly secure said member and element together.

2. An indicator of the kind described comprised of a member having an aperture therein, an open-ended relatively soft metallic element located in said aperture, one end of said element being formed with an annular turned-over flange to provide means for limiting endwise movement of said element and provide a pocket for receiving solder to assist in securing the member and element together, said metallic element having a portion which extends beyond said member to provide a tubular elongated extension adapted to expand and frictionally engage an end of a shaft in a manner to hold said shaft and member against relative rotation and cause said tubular extension to grip said member.

In witness whereof, I hereunto subscribe my name this 3rd day of April A. D., 1930.

HAROLD L. JOYCE.